United States Patent
Fischer et al.

(10) Patent No.: US 10,947,944 B2
(45) Date of Patent: Mar. 16, 2021

(54) METHOD AND DEVICE FOR DETERMINING THE INJECTION RATE OF AN INJECTION VALVE

(71) Applicant: Robert Bosch GmbH, Stuttgart (DE)

(72) Inventors: Thomas Fischer, Stuttgart (DE); Clemens Majer, Ingersheim (DE); Iris Hartung, Schorndorf (DE)

(73) Assignee: Robert Bosch GmbH, Stuttgart (DE)

(*) Notice: Subject to any disclaimer, the term of this patent is extended or adjusted under 35 U.S.C. 154(b) by 191 days.

(21) Appl. No.: 16/063,493

(22) PCT Filed: Nov. 28, 2016

(86) PCT No.: PCT/EP2016/078959
§ 371 (c)(1),
(2) Date: Jun. 18, 2018

(87) PCT Pub. No.: WO2017/102292
PCT Pub. Date: Jun. 22, 2017

(65) Prior Publication Data
US 2018/0372049 A1    Dec. 27, 2018

(30) Foreign Application Priority Data

Dec. 17, 2015  (DE) .......................... 102015225736.3

(51) Int. Cl.
*F02M 65/00* (2006.01)
*G01F 3/16* (2006.01)

(52) U.S. Cl.
CPC ............. *F02M 65/001* (2013.01); *G01F 3/16* (2013.01); *F02M 2200/304* (2013.01)

(58) Field of Classification Search
CPC ... F02M 65/001; F02M 2200/304; G01F 3/16
See application file for complete search history.

(56) References Cited

U.S. PATENT DOCUMENTS

| 2011/0185799 | A1* | 8/2011 | Schmidt | .................... G01F 3/16 |
| | | | | 73/114.48 |
| 2015/0337787 | A1* | 11/2015 | Varoquie | .............. F02M 65/001 |
| | | | | 702/25 |

FOREIGN PATENT DOCUMENTS

| CN | 101846004 A | 9/2010 |
| CN | 102840046 A | 12/2012 |

(Continued)

OTHER PUBLICATIONS

International Search Report with English translation and Written Opinion for Application No. PCT/EP2016/078959 dated Jan. 26, 2017 (12 pages).

*Primary Examiner* — Xin Y Zhong
(74) *Attorney, Agent, or Firm* — Michael Best & Friedrich LLP

(57) ABSTRACT

The invention relates to a method for determining the injection rate of an injection valve (1) using a mathematical model which is based on measurement values comprising the stroke (x) of a piston (3) that delimits a measurement chamber (2) during the injection of a test fluid (4) into the measurement chamber (2). The injection rate is corrected on the basis of an additional measurement value. According to the invention, the pressure ($p_a$) in an adapter volume (5), via which the injection valve (1) is connected to the measurement chamber (2), is used as an additional measurement value for correcting the injection rate. The invention further relates to a device for determining the injection rate of an injection valve.

12 Claims, 2 Drawing Sheets

(56) References Cited

FOREIGN PATENT DOCUMENTS

| | | |
|---|---|---|
| DE | 3806129 A1 | 9/1988 |
| DE | 3916419 A1 | 11/1990 |
| DE | 4321709 A1 | 1/1994 |
| EP | 2318689 A1 | 5/2011 |
| EP | 2821759 A1 | 1/2015 |
| FR | 2795139 A1 | 12/2000 |
| KR | 20030014992 A | 2/2003 |
| WO | 02054038 A2 | 7/2002 |

* cited by examiner

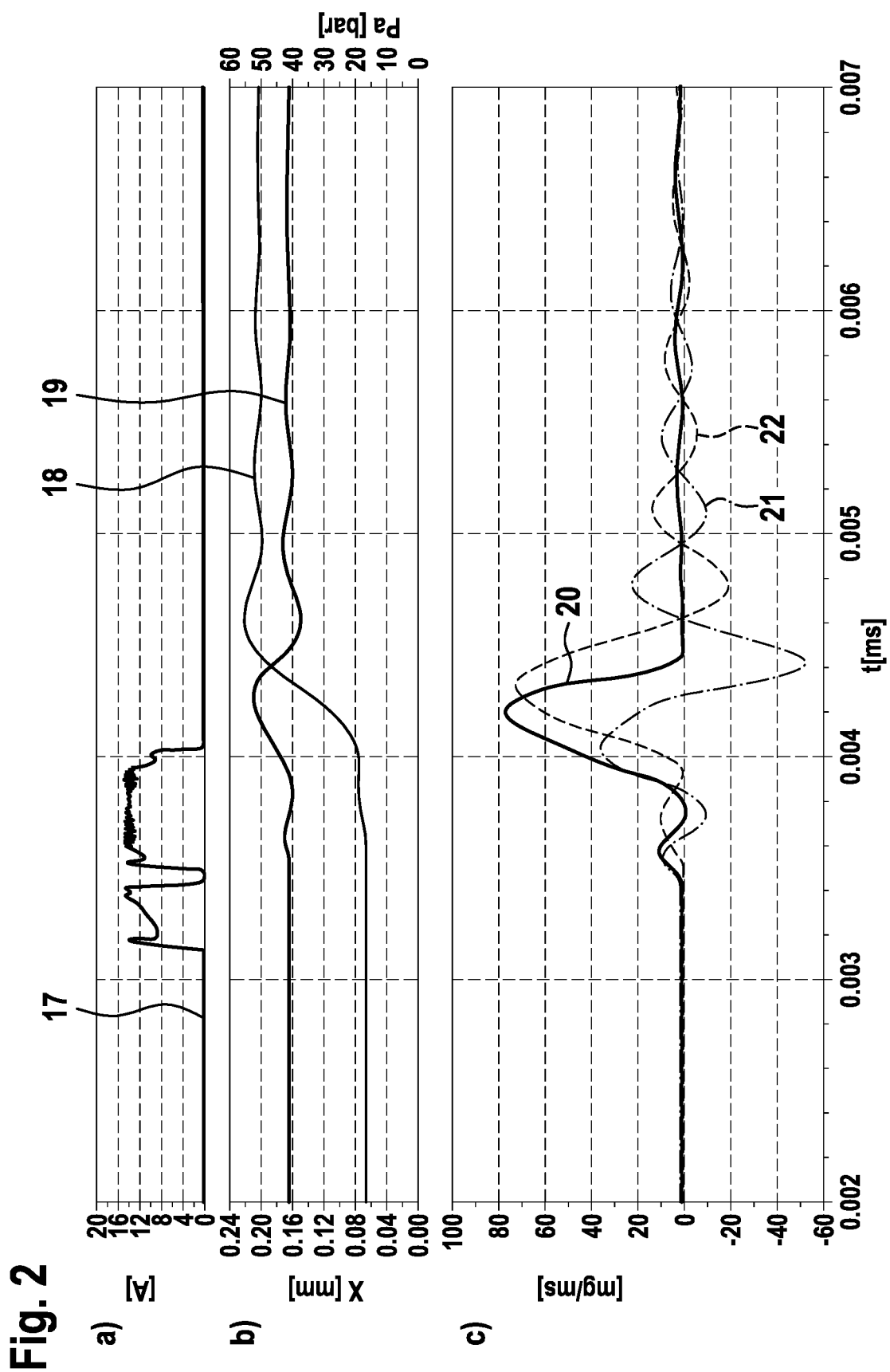

METHOD AND DEVICE FOR DETERMINING THE INJECTION RATE OF AN INJECTION VALVE

BACKGROUND OF THE INVENTION

The invention relates to a method for determining the injection rate of an injection valve. In addition, a device for determining the injection rate, which is suitable for carrying out the method according to the invention, is specified.

In the development and functional testing of injection valves, in particular of injection valves for injecting fuel into a combustion chamber of an internal combustion engine, a method which is described, for example, in German laid-open patent application DE 101 07 032 A1 has proven appropriate for the highly accurate measurement of the injection quantity. In this method, a test fluid is injected by an injection valve into a measuring chamber which is bounded at least partially by a piston. The travel of the piston which is brought about by the injection is detected and used as the basis for the calculation of the injection quantity. In order to increase the accuracy of the calculation, the pressure of the test fluid in the measuring chamber is also detected and taken into account during the calculation. The same applies to the temperature in the measuring chamber, since said temperature also influences the raw density of the test fluid, as does the pressure.

The injection quantity can then be calculated on the basis of the following equation:

$$m(\rho, x) = \rho(T, p) \cdot x \cdot A_{Kolben}$$

KEY: Kolben=piston where "$\rho$" is the raw density of the test fluid as a function of the variable temperature "T" of the test fluid, and the pressure "p" in the measuring chamber, "x" is the measured piston travel and "$A_{piston}$" is the cross-sectional area of the piston.

The injection rate can be determined in principle according to the following equation by deriving the injection quantity over time:

$$\frac{dm}{dt} = \frac{dx}{dt} \cdot A_{Kolben} \cdot \rho(T, p)$$

KEY: Kolben = piston

However, because the dynamic properties of the piston which bounds the measuring chamber, the measurement signals which are detected during the injection have interfering oscillations of the spring-mass systems superimposed on them, with the result that this approach for determining the injection rate can only be used to a limited degree for analysis of the injection profile with high resolution in terms of time, said resolution being necessary for the optimization of the injection valve.

German laid-open patent application DE 10 2013 212 419 A1 therefore already proposes a method for determining the injection rate of an injection valve or injector in which, building on the method described above, a correction of the injection rate is additionally carried out on the basis of a detected oscillation of the piston. The correction is carried out on the basis of a mathematical model which takes into account a damped oscillation with at least one damped oscillation frequency. The movement of the piston is divided for this purpose into an oscillation movement and into a residual movement, wherein the oscillation movement is described by means of the mathematical model, and the calculated movement data owing to the oscillation movement is subtracted from the movement data of the movement of the piston, in order to determine the movement data of the residual movement. The injection rate is then determined from the movement data of the residual movement or from the injection rate portion of the residual movement.

Since ever more features are determined on the basis of the injection rate profile during the development and functional testing of injection valves, these being, for example, the start of injection, the injection rate maximum and/or the end of injection, precise measured values are required in order to obtain reliable results.

Taking the abovementioned prior art as a basis, the present invention is therefore based on the object of specifying a method and a device which permit a most precise possible determination of the injection rate of an injection valve.

SUMMARY OF THE INVENTION

In the proposed method, the injection rate of an injection valve is also determined using a mathematical model. The mathematical model is based on measured values which comprise the travel of a piston banding a measuring chamber during the injection of a test fluid into the measuring chamber. In addition, a correction of the injection rate is carried out on the basis of a further measured value. According to the invention, the pressure in an adapter volume, via which the injection valve is connected to the measuring chamber, is used as a further measured value.

The injection of the test fluid into the measuring chamber accordingly does not take place directly but rather indirectly via an adapter volume which is formed in an adapter for receiving the injection valve. The adapter facilitates the connection of the injection valve to the measuring device, in particular the injection valve can be connected in a fluid-tight fashion to the measuring device via the adapter. This applies, in particular, if a corresponding seal is provided.

The use of an adapter for receiving the injection valve is basically known from the prior art. However, insufficient attention has previously been paid to the fact that the adapter volume gives rise to a delay and/or to damping of the injection and therefore to a delayed and/or rounded off injection rate profile if only the piston travel profile is taken into account during the calculation. In addition, an adapter seal can also cause, owing to its visco-elastic behavior, an oscillation which is superimposed on the piston travel.

However, if the pressure in the adapter volume is additionally detected in accordance with the method according to the invention and taken into account during the calculation of the injection rate, both oscillation-induced interference variables and delays or rounding off of the injection rate profile can be eliminated.

The injection rate can then be calculated as follows:

$$\frac{dm}{dt} = V_a \cdot \frac{\partial \rho_a}{\partial p_a}\bigg|_T \cdot \dot{p}_a(t) + \dot{x}(t) \cdot A_{Kolben} \cdot \rho(p, T)$$

KEY: Kolben = piston where "$V_a$" stands for the adapter volume, "$\rho_a$" stands for the raw density of the test fluid in the adapter volume, and "$p_a$" stands for the pressure in the adapter volume.

The pressure profile in the adapter volume therefore constitutes, in addition to the piston travel profile and the temperature and the pressure in the measuring chamber, a further measurement variable which forms the basis of the calculation of the injection rate according to the method according to the invention. The adapter volume and the cross-sectional area of the piston constitute known variables. The calculation is therefore preferably carried out in real time.

The additional expenditure on equipment for carrying out the method according to the invention is low. All that is necessary is a further pressure sensor which is assigned to the adapter volume, in order to detect the pressure in the adapter volume during the injection. That is to say measuring devices which are already present can be used insofar as they are expanded with a corresponding pressure sensor.

The temperature and the pressure in the measuring chamber are preferably detected by means of a temperature sensor and a pressure sensor which are each assigned to the measuring chamber. The detection of the temperature and of the pressure in the measuring chamber is necessary to determine the raw density of the test fluid.

It is also preferred that the measured values which are detected during the injection are passed on as measurement signals to a control unit. In order to calculate the injection rate on the basis of the measurement signals, the mathematical model for calculating the injection rate is preferably stored in the control unit.

The device which is also proposed for solving the object specified at the beginning and which has the purpose of determining the injection rate of an injection valve comprises a measuring chamber which is bounded by a piston and which can be connected to the injection valve via an adapter volume which is formed in an adapter for receiving the injection valve, with the result that that a test fluid can be injected into the measuring chamber by means of the injection valve. In addition, the device comprises a travel measuring device for detecting the piston travel during an injection. According to the invention, a pressure sensor by means of which the pressure in the adapter volume can be detected during an injection is assigned to the adapter volume.

The proposed device is suitable for carrying out the method according to the invention as described above by virtue of the pressure sensor which is assigned to the adapter volume. This is because in addition to the piston travel profile the pressure profile in the adapter volume can also be detected and is used as the basis for correcting the injection rate profile. In this way, interference variables caused by oscillations and delays or damping of the injection rate profile owing to the intermediately connected adapter volume can be eliminated.

An injection damper is preferably arranged between the adapter volume and the measuring chamber. The injection damper prevents the injection jets of the test fluid which is injected into the measuring chamber via the adapter volume from impacting directly on the upper side of a piston and causing it to oscillate.

The injection damper leads to a dynamic pressure in the adapter volume and therefore to a further delay or damping of the injection. However, by means of the method according to the invention or the device according to the invention the dynamic pressure in the adapter volume during an injection is also detected, so that the dynamic pressure profile is taken into account by the injection damper during the calculation of the injection rate. The calculation therefore provides very precise results.

In addition, it is proposed that the measuring chamber be assigned a temperature sensor and a pressure sensor. The temperature and the pressure in the measuring chamber during an injection can be detected by means of these sensors. These measured values permit precise determination of the raw density of the test fluid.

The device for determining the injection rate of an injection valve advantageously comprises a control unit. The control unit permits precise calculation of the injection rate on the basis of the measured values which are made available to it. In order to pass on the measured values to the control unit, the latter is preferably connected via control lines to the travel measuring device, the pressure and temperature sensor in the measuring chamber and the pressure sensor in the adapter volume. The measured values are accordingly transmitted as measurement signals from the respective measuring device to the control unit. Since the calculation of the injection rate is carried out using the mathematical model, the latter is also preferably stored as a computer program in the control unit.

The measuring chamber of the device according to the invention is preferably connected to an emptying valve. The pressure in the measuring chamber can be controlled by means of an opposing pressure force. Since the pressure which is present in the measuring chamber brings about a pressure force on the piston which bounds the measuring chamber, an opposing pressure force, which is generated by a further pressurized volume, in particular a gas volume, and/or by a spring, is applied to said piston on its side facing away from the measuring chamber.

Furthermore, the device according to the invention is suitable for carrying out the method according to the invention.

BRIEF DESCRIPTION OF THE DRAWINGS

The method according to the invention and the device according to the invention are explained in more detail below with reference to the appended drawings, in which:

FIG. 2 shows a diagram illustrating a corrected injection rate profile.

DETAILED DESCRIPTION

Figure 1:
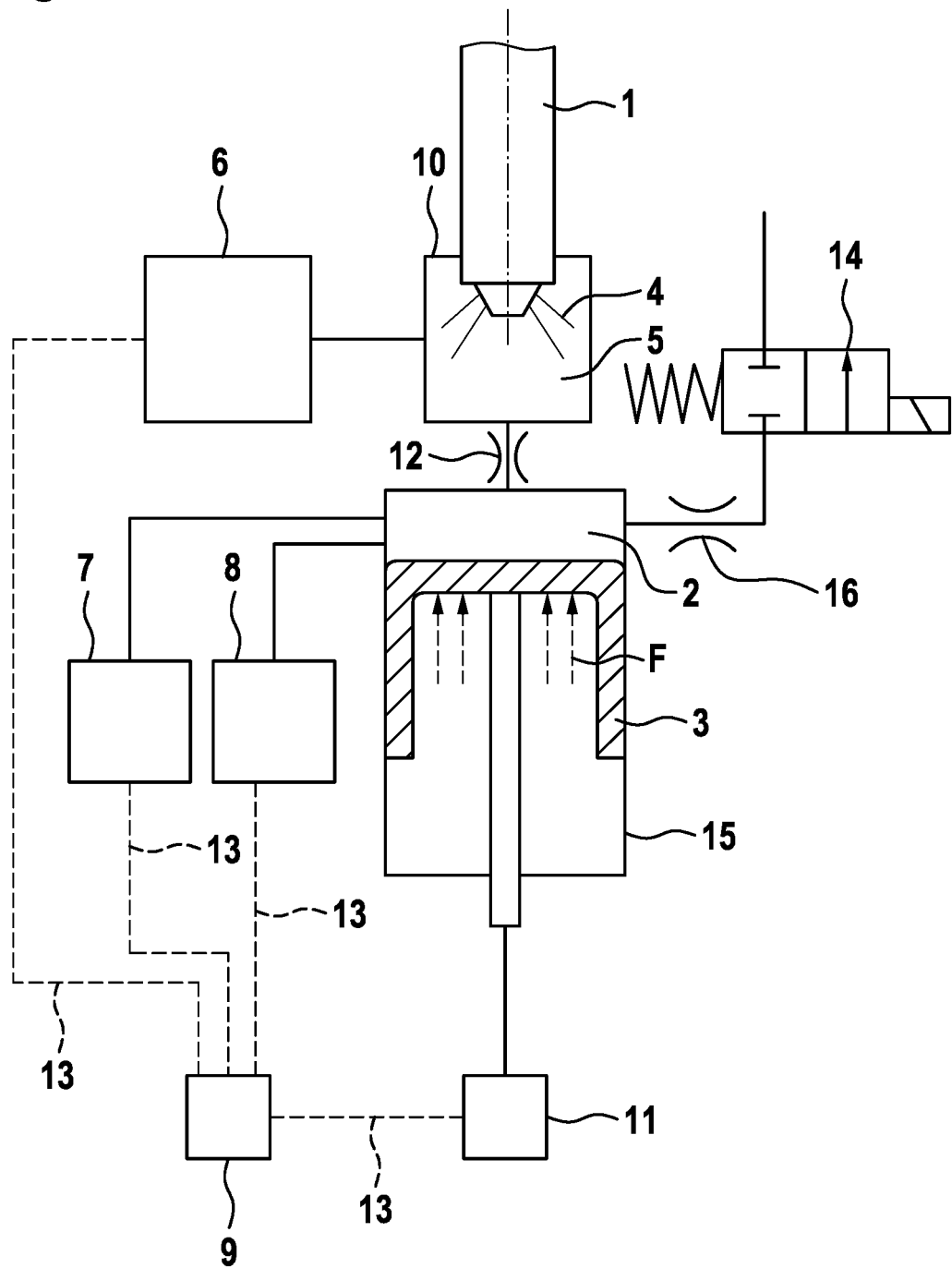
FIG. 1 shows a schematic illustration of a device according to the invention.

The device according to the invention which is illustrated schematically in FIG. 1 comprises a piston 3 which is received in a reciprocally movable fashion in a cylinder 15 and bounds a measuring chamber 2 within the cylinder 15. The measuring chamber 2 is connected to an emptying valve 14 via a throttle 16. On the side of the piston 3 facing away from the measuring chamber 2, an opposing pressure is applied which brings about a pressure force F which acts on the piston 3 in the direction of the measuring chamber 2, with the result that an equilibrium of forces is present at the piston 3, and the pressure in the measuring chamber 2 can be controlled.

In order to determine the injection rate of an injection valve 1, a test fluid 4 can be injected into the measuring chamber 2 by means of the injection valve 1. The injection brings about travel of the piston 3 counter to the pressure force F, which travel can be detected by means of a travel measuring device 11. The travel measurement is inductive here, wherein the measured values are passed on as measurement signals to a control unit 9 via a control line 13. The control unit 9 is also connected via control lines 13 to a temperature sensor 7 and a pressure sensor 8 which serve to detect the temperature and the pressure in the measuring chamber 2. These measured values influence the raw density of the test fluid 4 and are accordingly relevant for the calculation of the injection rate.

The injection of the test fluid 4 into the measuring chamber 2 takes place here indirectly via an adapter volume 5 which is connected to the measuring chamber 2 via an injection damper 12. The adapter volume 5 is formed in an adapter 10 which serves to receive the injection valve 1. The injection damper 12 which is formed between the adapter volume 5 and the measuring chamber 2 is intended to prevent direct impacting of the injection jets of the test fluid 4 onto the piston 3 which bounds the measuring chamber 2, and therefore to prevent undesired excitation of oscillations of the piston 3.

The injection of the test fluid 4 into the measuring chamber 2 which is brought about only indirectly via the adapter volume 5 and the injection damper 12 results in a delay or in damping of the injection. This in turn gives rise to a delayed and rounded-off injection rate profile. Accordingly, there is a need to correct the determined injection rate.

The device according to the invention which is illustrated in FIG. 1 has for this purpose a further pressure sensor 6 which is assigned to the adapter volume 5, so that the pressure in the adapter volume 5 can be detected by this means. A control line 13 connects the pressure sensor 6 to the control unit 9, so that the measured values which are detected by the pressure sensor 6 are passed on as measurement signals to the control unit 9, in order to take them into account during the calculation of the injection rate. The injection rate can then be calculated according to the following equation:

$$\frac{dm}{dt} = V_a \cdot \frac{\partial p_a}{\partial p_a}\bigg|_T \cdot \dot{p}_a(t) + \dot{x}(t) \cdot A_{Kolben} \cdot \rho(p, T)$$

KEY: Kolben = piston

The changes in density are stored as a characteristic diagram as a function of the present temperature $$\frac{\partial p_a}{\partial p_a}\bigg|_T.$$

The pressure in the adapter volume 5, which is detected by means of the further pressure sensor 6, not only permits interfering oscillation components to be eliminated but also permits the injection rate to be corrected with respect to a chronological offset and/or damping or rounding off, as illustrated, for example, in the diagram in FIG. 2.

The curve which is illustrated in the upper part a) of the diagram shows the duration of the energization of an actuator (not illustrated) of an injection valve 1 whose injection rate is to be determined. The injection valve 1 opens and closes as a function of the energization of the actuator, so that injection is performed. In this way, a test fluid 4 is injected into the measuring chamber 2 via the adapter volume 5. The injection results in travel x of the piston 3 which bounds the measuring chamber 2, the profile of which travel x is illustrated in the middle part b) of the diagram as a curve 18. The curve 19 represents the profile of the pressure $p_a$ in the adapter volume 5.

In the lower part c) of the diagram, the injection rate profile is illustrated, wherein the curve 20 illustrates the injection rate profile which is corrected on the basis of the equation specified above. This is because, as also illustrated in the part c) of the diagram, an injection rate profile (curve 21) which is calculated solely on the basis of the piston travel profile has a time shift with respect to the curve 20 as well as interfering oscillation components. These can be eliminated by additionally detecting the pressure $p_a$ in the adapter volume 5 and using it to correct the injection rate. The curve 22 shows the profile of an injection rate which has been calculated from the pressure $p_a$.

What is claimed is:

1. A method for determining an injection rate of an injection valve (1) using a mathematical model on which measured values which comprise a travel (x) of a piston (3) bounding a measuring chamber (2) during an injection of a test fluid (4) into the measuring chamber (2) are based, wherein a correction of the injection rate is carried out on the basis of a further measured value,
    the method comprising using a first pressure ($p_a$) measured during the injection and in an adapter volume (5), via which the injection valve (1) is fluidly connected to the measuring chamber (2) during the injection, as said further measured value for correcting the injection rate.

2. The method as claimed in claim 1, characterized in that during the injection the pressure ($p_a$) in the adapter volume (5) is detected by means of a pressure sensor (6) which is assigned to the adapter volume (5).

3. The method as claimed in claim 1, characterized in that during the injection a temperature (T) and a second pressure (p) in the measuring chamber (2) are detected by a temperature sensor (7) and a pressure sensor (8) which are assigned to the measuring chamber (2).

4. The method as claimed in claim 1, characterized in that the measured values which are detected during the injection are passed on as measurement signals to a control unit (9) in which the mathematical model for calculating the injection rate is stored.

5. A device for determining an injection rate of an injection valve (1), comprising, a measuring chamber (2) which is bounded by a piston (3) and which is fluidly connected to the injection valve (1) during an injection of a test fluid into the measuring chamber (2), the measuring chamber (2) being connected to the injection valve (1) via an adapter volume (5) which is formed in an adapter (10) for receiving the injection valve (1), such that the test fluid can be injected into the measuring chamber (2) by the injection valve (1), the device also comprising a travel measuring device (11) for detecting a travel (x) of the piston (3) during the injection,
    characterized in that a first pressure sensor (6) is configured to measure a first pressure ($p_a$) in the adapter volume (5) during the injection.

6. The device as claimed in claim 5, characterized in that an injection damper (12) is arranged between the adapter volume (5) and the measuring chamber (2).

7. The device as claimed in claim 5, characterized in that the measuring chamber (2) is assigned a temperature sensor (7) and a second pressure sensor (8) by which a temperature (T) and a second pressure (p) in the measuring chamber (2) during the injection can be detected.

8. The device as claimed in claim 5, further comprising a control unit (9) for calculating the injection rate, wherein the control unit (9) is connected via control lines (13) to the travel measuring device (11), the first pressure sensor (6), the temperature sensor (7) and the second pressure sensor (8).

9. The device as claimed in claim 5, characterized in that the measuring chamber (2) is connected to an emptying valve (14).

10. The device as claimed in claim 5, characterized in that the pressure in the measuring chamber (2) can be controlled by an opposing force of the piston (3).

11. The device as claimed in claim 5, characterized in that the device is configured to determine the injection rate of the injection valve using a mathematical model on which measured values which comprise the travel of the piston during injection of the test fluid into the measuring chamber are based, wherein a correction of the injection rate is carried out on the basis of a further measured value, the device being configured to use the pressure in the adapter volume (5), via which the injection valve is connected to the measuring chamber, as a further measured value for correcting the injection rate.

12. The device as claimed in claim 8, characterized in that a characteristic diagram for the derivative of a raw density ($\rho_a$) of the test fluid (4) at a given value of the first pressure ($p_a$) at the temperature (T) of the test fluid (4), $$\frac{\partial p_a}{\partial p_a}\bigg|_T,$$

is stored in the control unit (9) in order to calculate a pressure component in the corrected injection rate.

* * * * *